(12) United States Patent
Nagasaka et al.

(10) Patent No.: US 6,970,234 B2
(45) Date of Patent: Nov. 29, 2005

(54) FINGER IDENTIFICATION APPARATUS

(75) Inventors: Akio Nagasaka, Kokubunji (JP); Takafumi Miyatake, Hachioji (JP); Naoto Miura, Kokubunji (JP); Yoshiaki Amano, Tama (JP); Yoshimi Kasai, Kokubunji (JP); Shinichiro Umemura, Hachioji (JP); Miyuki Kono, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 204 days.

(21) Appl. No.: 10/142,894

(22) Filed: May 13, 2002

(65) Prior Publication Data

US 2003/0016345 A1    Jan. 23, 2003

(30) Foreign Application Priority Data

Jul. 19, 2001    (JP) ............................. 2001-218949

(51) Int. Cl.7 ............................................... G06K 9/74
(52) U.S. Cl. ........................................ 356/71; 382/115
(58) Field of Search ......................... 356/71; 382/115, 382/124, 125, 126

(56) References Cited

U.S. PATENT DOCUMENTS

| | | | |
|---|---|---|---|
| 4,787,742 A * | 11/1988 | Schiller et al. | 356/71 |
| 4,932,776 A * | 6/1990 | Dowling et al. | 356/71 |
| 4,936,680 A * | 6/1990 | Henkes et al. | 356/71 |
| 5,509,083 A * | 4/1996 | Abtahi et al. | 382/124 |
| 5,546,471 A * | 8/1996 | Merjanian | 382/124 |
| 5,926,261 A | 7/1999 | Hoshino | |
| 6,349,227 B1 | 2/2002 | Numada | |
| 6,404,904 B1 * | 6/2002 | Einighammer et al. | 382/124 |

FOREIGN PATENT DOCUMENTS

| | | |
|---|---|---|
| JP | 5-89229 | 9/1991 |
| JP | 6-168319 | 11/1992 |
| JP | 7-21373 | 6/1993 |
| JP | 7-171137 | 11/1994 |
| JP | 2001-45580 | 7/1999 |

* cited by examiner

Primary Examiner—Zandra V. Smith
Assistant Examiner—Roy M. Punnoose
(74) Attorney, Agent, or Firm—Reed Smith LLP; Stanley P. Fisher, Esq.; Juan Carlos A. Marquez, Esq.

(57) ABSTRACT

An identification apparatus that keeps the conditions for imaging uniform among successive identifications and requires a user to perform only a series of simple maneuvers. An identification apparatus comprising a guide member, a light source, and an imaging unit. The guide member includes a pattern or a structure that inspires a user to position his/her finger thereon or to approach his/her specific finger region thereto. A contact member such as a button switch is preferably located at a position in the guide member at which a fingertip is to be positioned. An optical opening is formed at a position coincident with a position at which a portion of a finger to be imaged for identification should be placed. The light source radiates near-infrared light through the portion of the finger to be imaged. The imaging means acquires an image of the finger, and the apparatus compares the image to previously registered images. The apparatus may also include dual light sources power saving functionality, and means for limiting the interference of external light sources.

23 Claims, 11 Drawing Sheets

FINGER IDENTIFICATION APPARATUS

CLAIM OF PRIORITY

This application claims priority to Japanese Patent Application No. 2001-218949 filed on Jul. 19, 2001.

BACKGROUND OF THE INVENTION

1. Field of the Invention

The present invention relates to an identification apparatus for identifying an individual using vital information, and, more particularly, the present invention relates to a finger identification apparatus that utilizes a hemal pattern of a finger and methods therefor.

2. Description of the Background

An individual identification technology is expected to enable the safe management of property and/or information. In particular, living body (personal) identification technologies that utilize parts of a human body as a key are beginning to attract attention. One reason for this is because a living body identification technology has a reduced chance for an illegal access to property or information resulting in a loss or robbery as compared to conventional technologies for managing property and information using a password or a key. Living body identification technologies include various techniques based on a fingerprint, a face, an iris, or a hemal pattern of a hand or a finger.

Among these techniques that are currently under study, the identification technique utilizing a hemal pattern of a finger is advantageous in that: (1) the technique reduces a user's reluctance to undergo identification because the technique is not associated with crime (unlike a technique utilizing a fingerprint); (2) the technique does not require direct irradiation of light into an eye (unlike a technique utilizing an iris); and (3) the technique reduces the possibility of forgery because it reads an internal feature of a living body instead of a superficial feature thereof.

The process for identifying an entity utilizing a hemal pattern of a finger will be described below. Initially, a light source for radiating near-infrared light is made available, and a camera is placed facing the light source so that the camera can pick up only light emanating from the light source image. The camera is provided with an optical filter that passes light with wavelengths which fall within the near-infrared band. For identification, a finger is interposed between the camera and light source in order to image the finger. Since hematic components absorb near-infrared light efficiently, the digital blood vessels do not transmit light and are therefore visualized dark (i.e., appear dark in the resultant image). The resultant image of a hemal pattern is then compared with an image of a registered pattern, whereby individual identification may be performed.

In order to correctly determine a correspondence between a hemal pattern and a registered pattern, an image must be produced under the same conditions for imaging between registration and identification. For example, if a finger is turned, a visualized hemal pattern is quite different from a registered pattern. As long as a finger is displaced or turned with its surface to be imaged held unchanged, an image of a hemal pattern produced during identification can be corrected readily through image processing. However, if a finger is so turned that the surface thereof is reversed from the dorsal side to the ventral side or vice versa, an image of a hemal pattern cannot easily be corrected because some blood vessels are unknown.

For example, an identification apparatus that utilizes the hemal pattern of the palm of a hand directs a user to hold a guide bar with his/her four fingers for positioning. The position of the palm of an individual's hand to be imaged is thus made invariable. However, as far as the digital blood vessels are concerned, if a user holds the bar or the like with his/her fingers, or, if a user stresses his/her fingers in some way, the digital blood vessels are compressed (as described above). Consequently, part of a hemal pattern may be missing or obscured. Another conceivable method is such that a guide rail or the like is included and a user is asked to place his/her fingers at a specified position on the guide rail. However, this method requires a user to learn how to place his/her fingers correctly. This means that not everybody can easily use the apparatus.

Moreover, a visualized hemal pattern varies depending on the posture of a finger inserted in an identification apparatus. For example, when a finger extended excessively with force has the blood vessels thereof compressed due to the epidermal stress, part of a hemal pattern may be missing. When extraneous light illuminating the entire identification apparatus changes, the brightness or contrast of a produced image varies. This may adversely affect precision in identification. Specifically, near-infrared light contained in ordinary sunlight or illumination light may adversely affect visualization of a hemal pattern.

SUMMARY OF THE INVENTION

Accordingly, the present invention preferably provides a low-cost identification apparatus that keeps the conditions for imaging uniform among identifications and directs a user to perform only a series of simple maneuvers. The related arts fail to guarantee that the conditions for imaging are the same among identifications.

In order to address one or more of the above objectives, according to the present invention, there is provided a finger identification apparatus comprising: a guide unit; a switch member; a light source; an imaging unit; and an identifying unit. The guide unit helps position a finger for identification. The switch member is preferably turned on or off with the fingertip. The light source that radiates transmissive light which is transmitted through a finger is placed opposite the imaging unit with a space for finger insertion located therebetween. When the switch member is turned on, the identifying unit performs identification on an image produced by the imaging unit.

Additionally, according to the present invention, there is preferably provided a finger identification apparatus comprising: a guide unit; a light source; an imaging unit; and an identifying unit. The guide unit helps position a bent finger. The light source that radiates transmissive light which is transmitted through a finger is placed opposite the imaging unit with a space for finger insertion located therebetween. The identifying unit performs identification on an image produced by the imaging unit.

The use of the present invention preferably leads a finger smoothly (and repeatably) to a specific position and orientation. Furthermore, since the digital blood vessels are not compressed, a resultant image may be collated with a registered image on a stable basis. This results in markedly improved precision in identification.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

Figure 1:
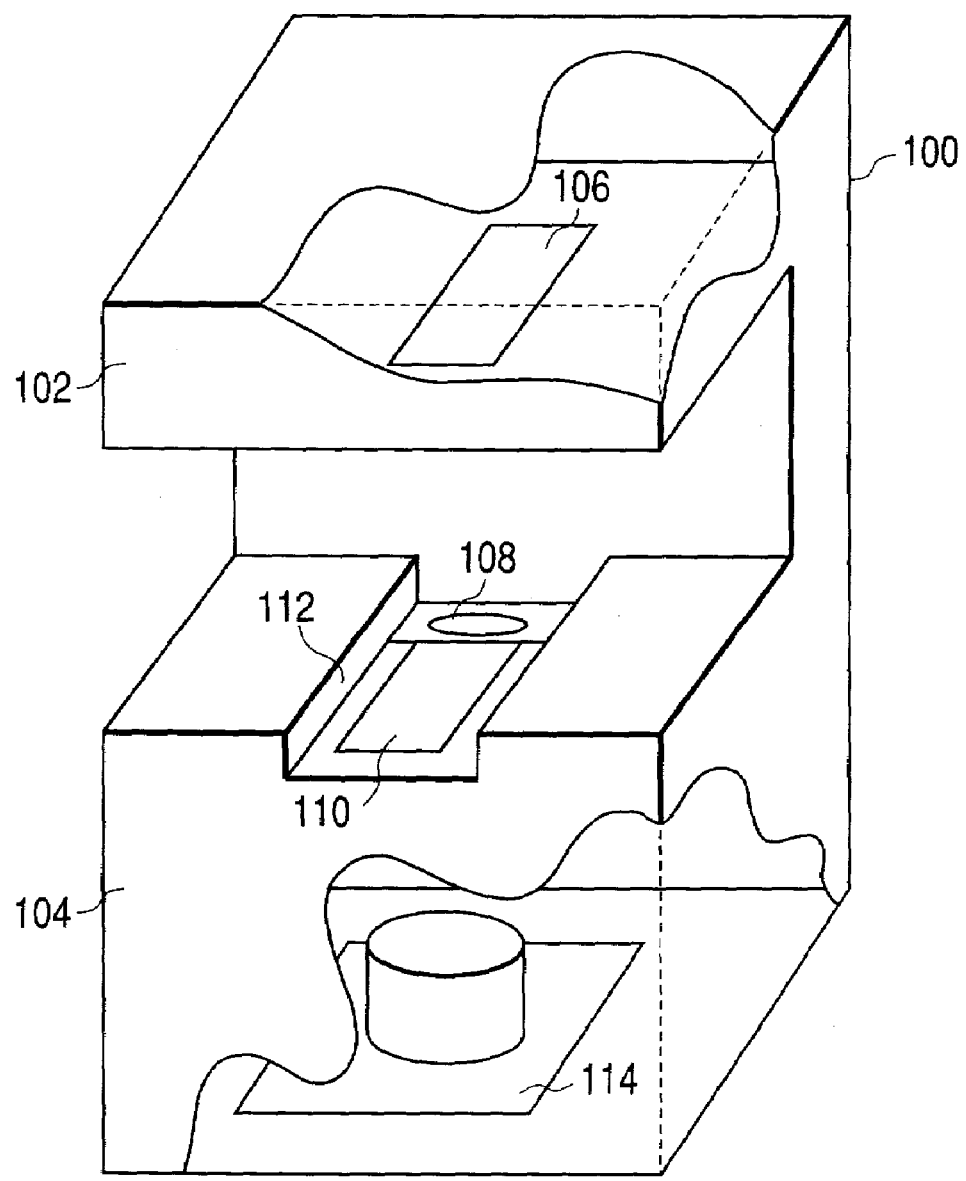
FIG. 1 shows an example of an apparatus according to the present invention.

FIG. 1 schematically shows an identification apparatus 100 according to the present. The body of the apparatus is broadly divided into a light source unit 102 and an imaging unit 104. A space is created between the light source unit 102 and the imaging unit 104. For identification, a finger is inserted into this space. The light source unit 102 preferably covers over the space into which a finger is inserted and intercepts (shields) illumination light radiated from the ceiling or other external source to prevent a direct invasion of the light into the imaging unit. In the FIG. 1 embodiment, the space is not enclosed with a side wall. Alternatively, the space may be enclosed with one or more side walls in order to hinder lateral invasion of extraneous light. In this case, the side walls are preferably coated with a dye such as an anti-reflection coat in order to prevent irregular reflection of near-infrared light, or the side walls are preferably made of an anti-reflection material. This is intended to improve precision in identification.

The light source unit 102 has a light source 106 which radiates near-infrared light whose wavelengths are about 810 nanometers (nm) towards a camera 114 included in the imaging unit 104. A finger is inserted into the space between the light source 106 and camera 114, whereby near-infrared light is transmitted through the finger and picked up the camera 114. Consequently, the hemal pattern of the finger is imaged. A guide groove 112 helps the user intuitively understand the correct position at which a finger should be located and the direction in which the finger should be oriented. A button switch 108 is preferably located at a position at which a fingertip reaches when a finger is placed along the guide groove 112.

An opening 110 is located to coincide with a portion of the finger including the first and second joints thereof. The opening 110 is covered with a transparent glass plate, a transparent acrylic plate, or other material which passes light and prevents invasion of foreign objects into the inside of the identification apparatus. The camera 114 requires an optical filter that transmits only light whose wavelengths fall within the near-infrared band. An optical filter plate may be substituted for the glass or acrylic plate, whereby the capabilities of the glass or acrylic plate and of the optical filter can be integrated.

The identification process is initiated when a user presses the button switch 108. The maneuver of pressing a button is an action people perform frequently in their daily lives. Therefore, a user should quickly get accustomed to this maneuver of pressing a button. Every time a user places his/her finger in a natural manner so as to press the button 108, the user's fingertip is located at a substantially fixed position. In this way, the finger can be smoothly placed at a position which can be repeated by the finger.

Once the fingertip is positioned, the finger is guided along the guide groove 112. The direction in which the entire finger is oriented is determined accordingly. A region of the finger lying over the opening 110 is thereby determined, and a range thereof to be imaged is nearly uniquely determined. Moreover, when the user presses the button 108, the finger joints are bent in a fixed direction. The ventral part of the fingertip is naturally oriented in a direction perpendicular to a direction in which the button is dented. If a finger is turned sideways, the surface of the finger to be imaged may be changed, that is, the dorsal part of the finger may be imaged at one time, and the ventral part thereof may be imaged at another time. However, this will not take place because of the bending action.

When a user presses the button 108 with his/her finger, the finger is bent naturally. The epidermis of the user's hand other than the epidermis of the finger will not be stressed. Therefore, the digital blood vessels will not be compressed, and no part of the hemal pattern will be missing. Moreover, as long as the finger is bent naturally, the finger will not touch the glass plate covering the opening 110. Therefore, the possibility that a finger touches the glass plate and that the digital blood vessels are compressed or the glass plate gets dirty will be reduced.

As long as the position at which a finger is placed is nearly fixed, the area of the opening 110 may be made sufficiently small so that the opening 110 is blocked with a finger. If extraneous (external) light can be blocked, a change in brightness or contrast caused by the extraneous light can be prevented. In the conventional methods, because the position at which a finger is placed is not fixed, the opening is made rather large in order to image a wide area on the finger. A portion of the image depicting the same hemal pattern as the one visualized during registration must then be searched. Therefore, high-cost hardware for computation is needed to search the same hemal pattern as the one visualized during registration. Since the conventional opening is large, extraneous light easily enters. An identification apparatus in accordance with the conventional method is therefore susceptible to "noise". This drawback is addressed through the inclusion of the button 108.

Moreover, the conventional identification technique based on a hemal pattern of a finger does not present a means for requesting the start of the identification process such as a switch to be manipulated by a user. The identification apparatus itself determines the start of the identification, which may confuse some users. The inclusion of the button switch 108 itself is therefore effective in improving maneuverability.

It should be noted at this time that the guide groove 112 is not limited to the illustrated shape. Moreover, a finger need not always touch the guide groove 112. For example, a wire-like guide or a guide shaped (e.g., like a finger rest) will do. In short, something capable of guiding a finger unidirectionally is sufficient for the present invention.

Figure 11:
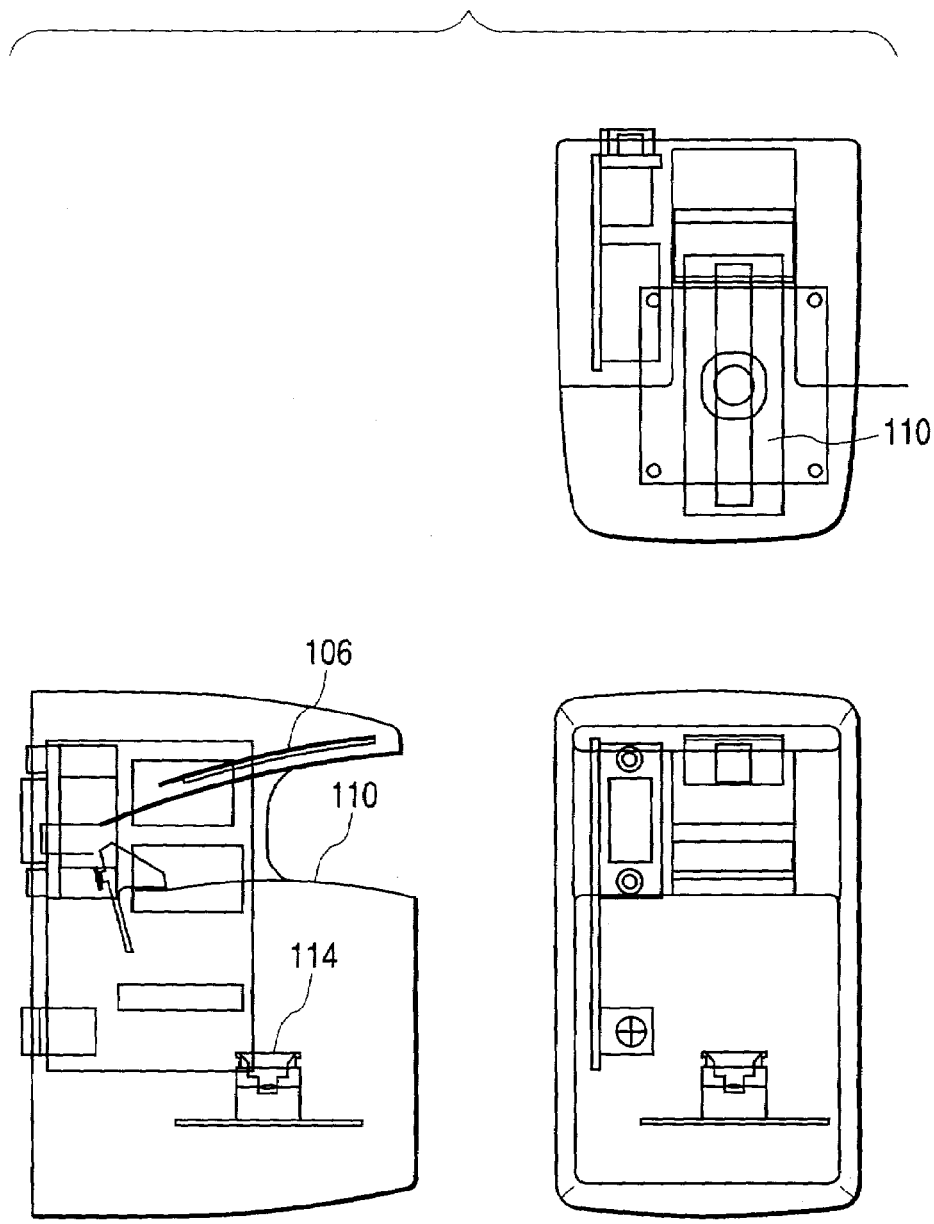
FIG. 11 includes three side views of a finger identification apparatus according to the present invention.

FIG. 11 includes a top and two side views of an alternative embodiment of the present invention from that shown in FIG. 1. As shown in FIG. 11, the distance from the upper part of the structure to the lower part thereof at the apparatus opening is different from the space created between the upper and lower parts at the deep end of the apparatus. Moreover, the surfaces of a light source 106 included in the upper part and of the opening 110 included in the lower part are arched in this embodiment. The curvature of the arched surface of the upper part is preferably larger than that of the arched surface of the lower part. Because of this design, when a finger is inserted into the structure, even if the ventral part of the finger is oriented sideways or obliquely, the orientation of the finger is corrected smoothly so that the ventral part of the finger will face down as the finger is advanced to the deep end of the space. This is because the space gets narrower towards the deep end thereof. Furthermore, near-infrared light emanating from the light source 106 is radiated evenly because of the curvature. Moreover, the distance from a camera 114 to any point in the opening 110 is uniform. This leads to identification with higher precision.

Figure 2:
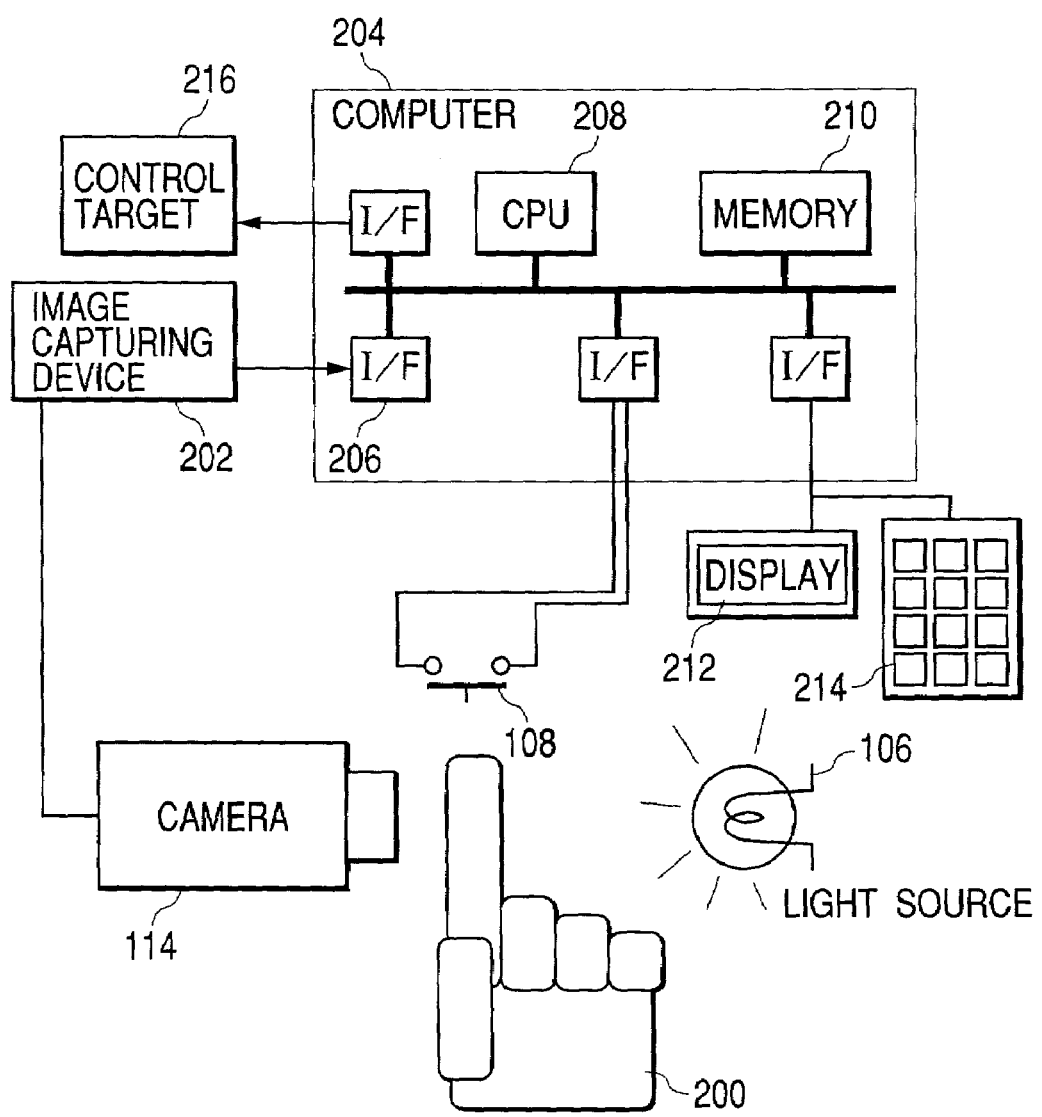
FIG. 2 shows an example of the configuration of an apparatus according to the present invention.

FIG. 2 is a schematic block diagram showing the configuration of an identification apparatus according to the present invention. A finger of a hand 200 is inserted in a space created between a light source 106 and a camera 114. With a press of a switch 108, an image signal representing a hemal pattern is acquired. The image signal transferred from the camera 114 is converted into digital data by an image capturing device 202 and is stored in a memory 210 via an input/output interface 206 of a computer 204. The switch 108 is connected to the computer via an input/output interface. The on/off state of the switch 108 is stored in the memory 210.

The instant the switch 108 is turned on, an interrupt signal is generated and transmitted to a CPU 208. When the CPU 208 confirms that the switch 108 is turned on, or when the CPU 208 senses generation of the interrupt signal indicating that the switch 108 is turned on, the CPU 208 activates and runs a software program that performs identification. Based on the results of the identification performed by the program, the CPU 208 executes any of various control sequences. Namely, the CPU 208 may display the result on a display device 212 or transmit an appropriate instruction signal to a control target 216, for example, that a door should be opened or closed. A keyboard 214 may be used to enter auxiliary information concerning identification, for example, a password.

Figure 12:
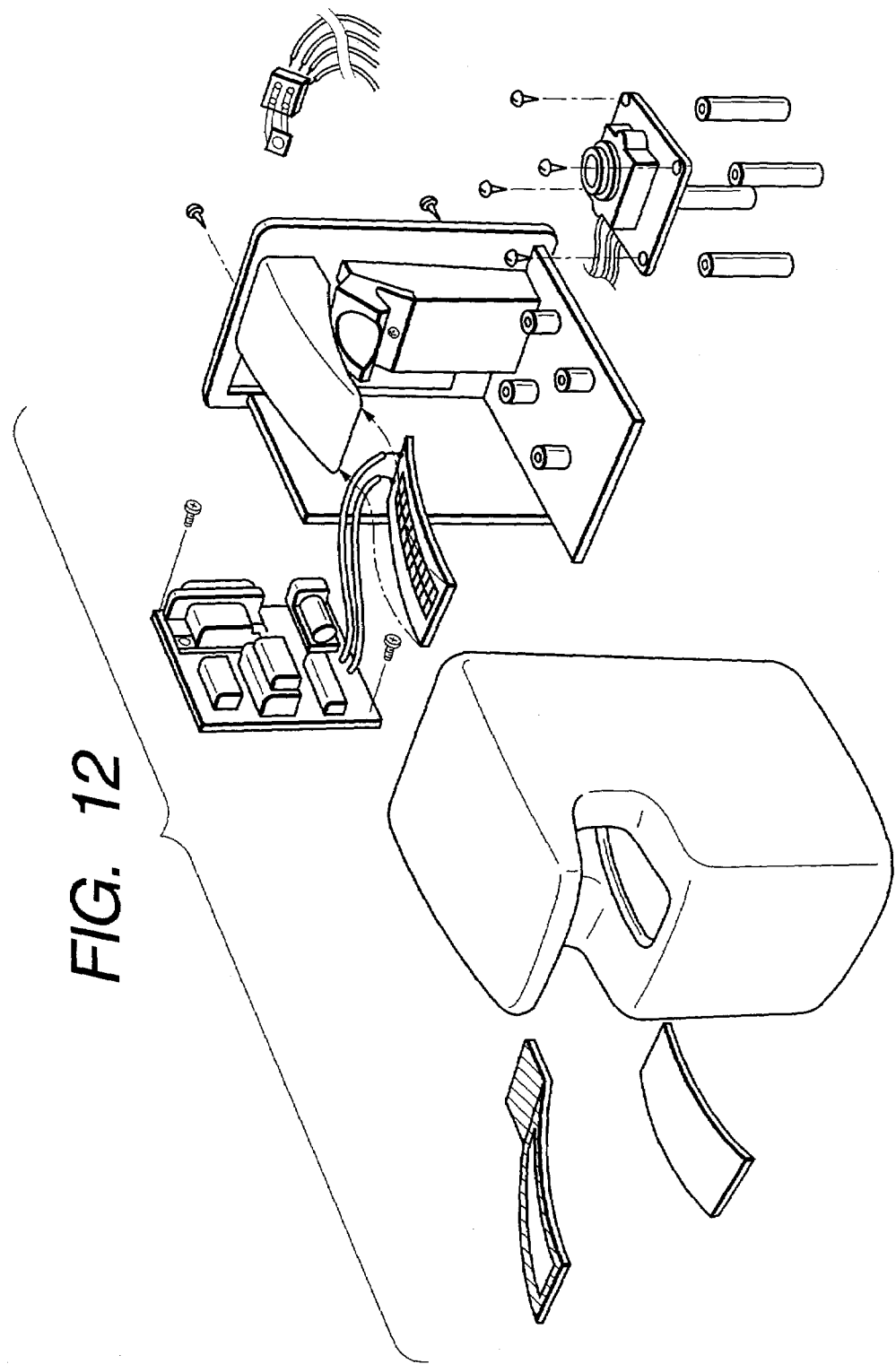
FIG. 12 is a perspective view showing the assembly of components of a finger identification apparatus according to the present invention.

FIG. 12 is a perspective view showing exemplary components of the finger identification apparatus shown in FIG. 11 and FIG. 2 which are to be assembled.

Figure 3:
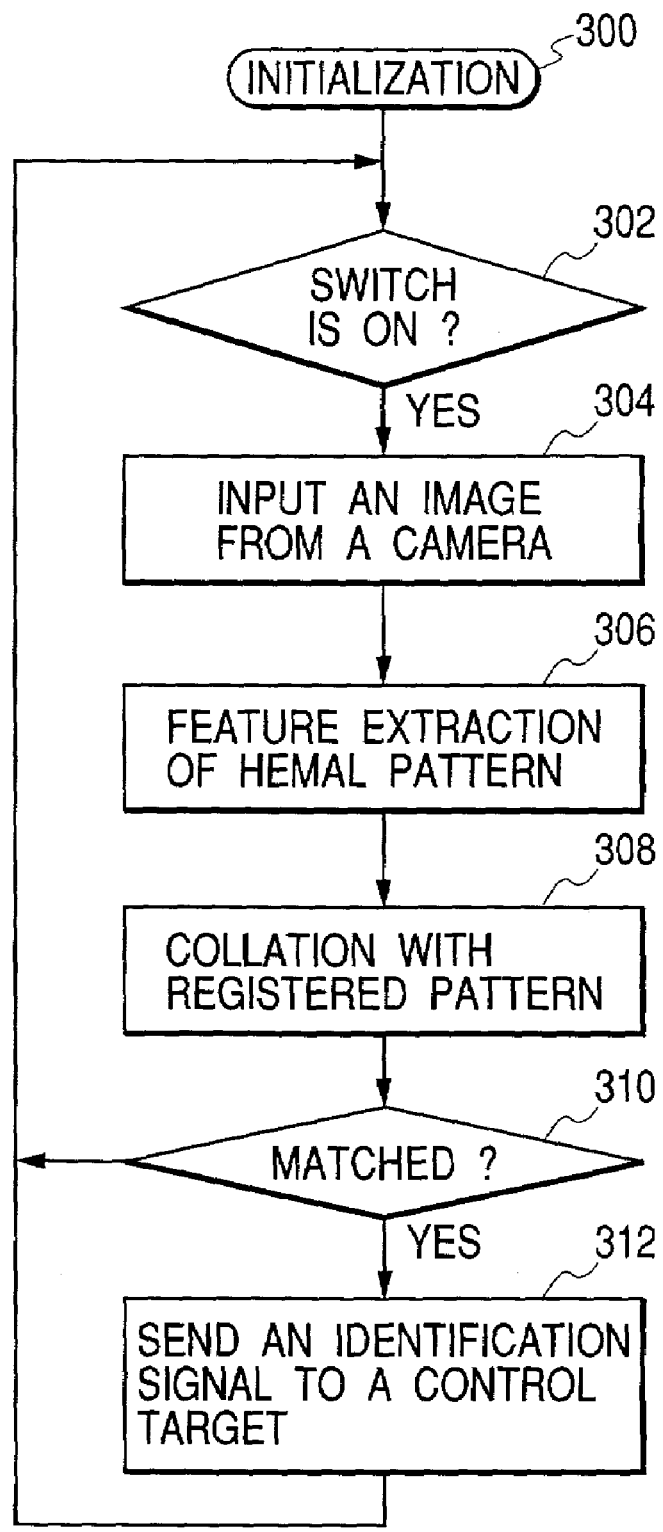
FIG. 3 shows an example of a process flow performed by software used to implement the present invention.

FIG. 3 shows an example of a processing flow performed by software run by the hardware, or especially, the CPU 208. During processing 300, the entire hardware is initialized, and initial values are assigned to temporal variables needed to run the program. Once hardware initialization is complete, the program preferably becomes idle and waits until the switch 108 is turned on (302). When the switch 108 is turned on, an image of a finger picked up by the camera 114 is stored in the memory 210 (304). Image processing is performed on the stored image data in order to extract the features of a hemal pattern (306). A registered pattern to which the hemal pattern corresponds is searched for, or in other words, the hemal pattern is collated with registered patterns (308). If any registered pattern corresponds to the hemal pattern (310), a signal indicating that a correct access authority is identified or identification data concerning an identified individual is transmitted to a control target such as equipment or a software program that requires identification (312).

A standby state is then preferably re-established and retained until the switch is activated again. The power supply of the hardware may also be turned on or off responsive to the on/off operation of the button switch 108. When the button switch 108 is pressed, the power supply is preferably turned on. The foregoing processing flow is performed except step 302 until step 310 is completed. If identification succeeds, the steps ending with step 312 are executed successively. Thereafter, the power supply is turned off again. Thus, power consumption required in a standby state can be minimized.

The on/off operation of the light source may also be controlled. When the button switch 108 is turned on, the light source is preferably turned on at the same time. When identification is completed, the light source is turned off at the same time. With respect to the on/off operation of the power supply of the apparatus, it may take an extended amount of time to activate the apparatus, although this factor depends on the configuration of the apparatus. Therefore, when an emphasis is put on timing, efforts should be made to save power required by the light source alone. The on/off operation of the light source may be physically interlocked with the on/off operation of the switch 108. A switching circuit including relays and transistors may be connected to the input/output interface 206 of the computer 204, whereby a switch used to turn on or off the light source may be electronically controlled.

The above type of electronic control circuit having a switch turned on or off quickly can also be used to control so-called "pulse width modulation" (PWM). Consequently, the brightness of the light source can be controlled stepwise. The thickness of a finger differs from person to person. As long as an amount of light is fixed, whether a hemal pattern is successively visualized depends on the person. Through the step-wise control of the amount of light, a finger may be imaged continuously until the hemal pattern is successfully visualized. This leads to improved precision in identification. In addition, if a sensor for measuring the thickness of a finger is included is in the apparatus, the relationship between the thickness of a finger and an optimal amount of light is calculated in advance and stored. Thus, an optimal hemal pattern can be visualized by picking up the least number of images.

Figure 9:
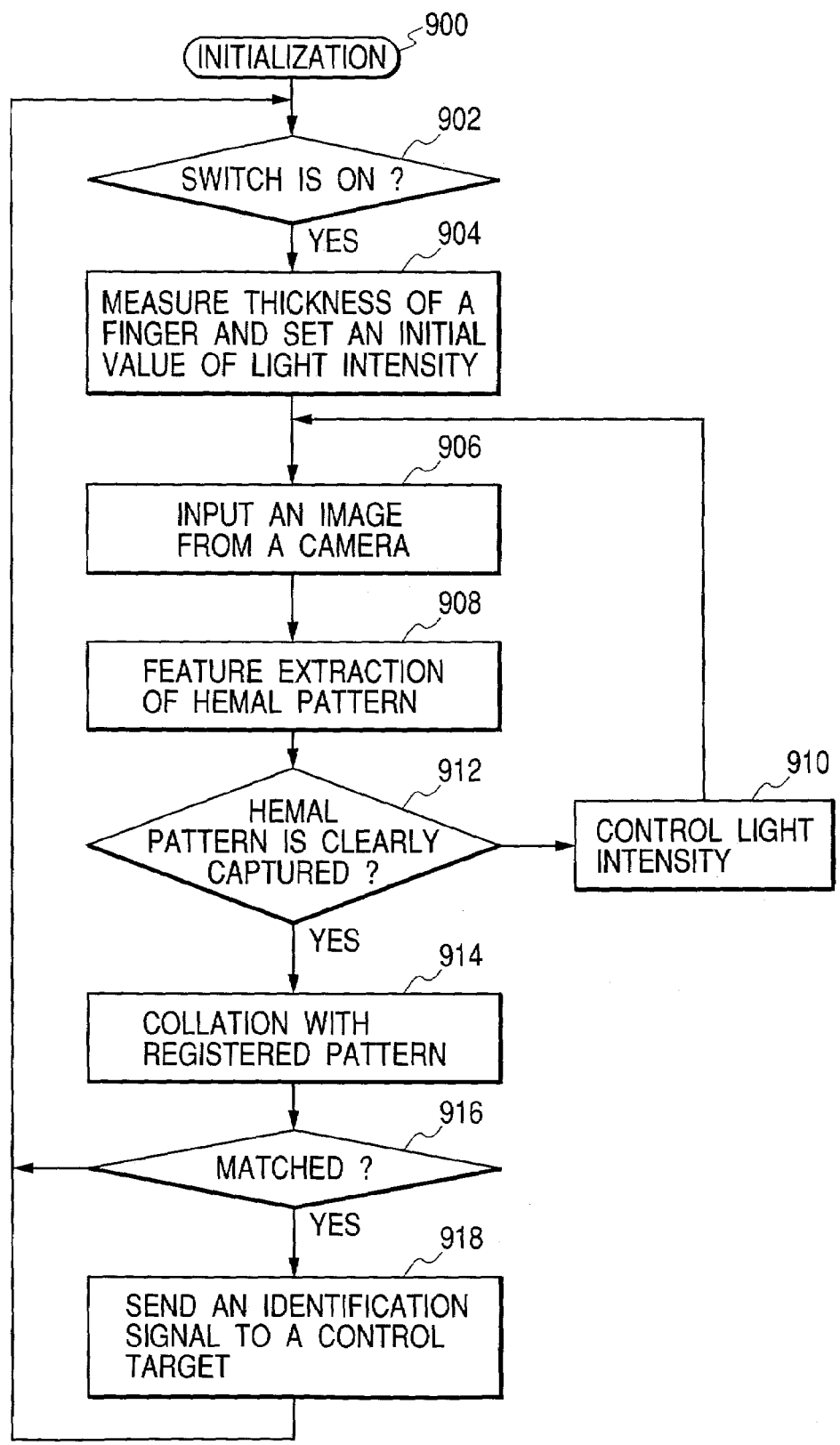
FIG. 9 shows an example of a processing flow performed by software used to perform light level control according to the present invention.

FIG. 9 is a flowchart describing light level control dependent upon the thickness of a finger. During processing 900, the entire hardware is initialized, and initial values are assigned to temporal variables needed to run the program. When hardware initialization is completed, the program becomes idle and waits until the switch 108 is turned on (step 902). When the switch is turned on, a sensor or the like is used to measure the thickness of a finger. A look-up table in which a set of the thickness values and initial light level values is recorded in advance is preferably used to determine an initial amount of light that is to emanate from the light source 106. Thereafter, a finger is imaged using the camera 114, and the image data is stored in the memory 210 (step 906). The stored image data is subjected to feature extraction 908 that extracts the features of a hemal pattern, and a determination is made as to whether a hemal pattern was correctly visualized (step 912).

If a hemal pattern is not visualized, the amount of light is changed (step 910), and image data is fetched from the camera again. As for the direction in which the amount of light is changed (e.g., up or down), when an image of a finger is too bright, it signifies that the amount of light is so large as to cause saturation. The amount of light is therefore reduced. In contrast, when the image of a finger is too dark, it signifies that the amount of light is presumably so small as to lower a signal-to-noise ratio relative to transmissive light. The amount of light is therefore increased. The brightness of a finger image is preferably calculated using an average of pixel values.

Thereafter, a registered pattern to which the visualized hemal pattern corresponds is searched for, that is, the visualized hemal pattern is collated with the registered patterns (step 914). If the visualized hemal pattern corresponds to any registered pattern (step 916), a signal indicating that a correct access authority is identified or identification data concerning an identified individual is transmitted to a control target, that is, equipment or a software program that requires identification (step 918). A standby state is then established again and retained until the switch is activated.

Figure 10A:
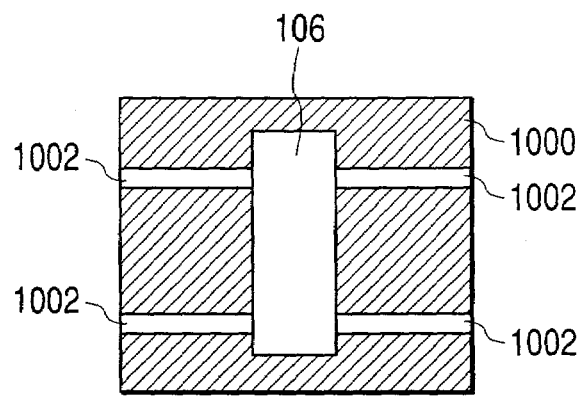
FIGS. 10A and 10B show an exemplary device for measuring the thickness of a finger according to the present invention.
Figure 10B:
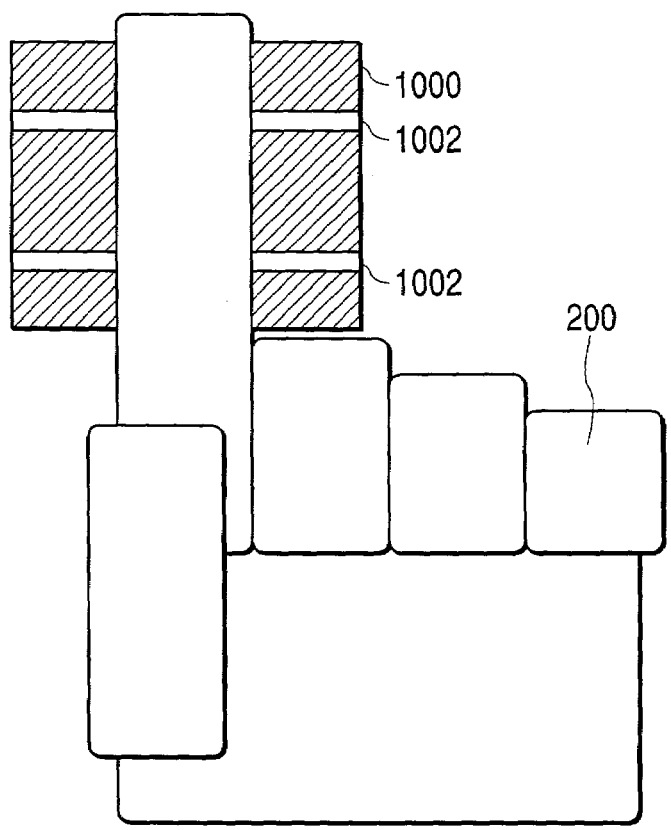

FIG. 10A and FIG. 10B illustrate an exemplary method for measuring the thickness of a finger without using a sensor. FIG. 10A shows a plane that contains a light source 106 and that is imaged by a camera opposed to the light source. A light source 106 is located in the center of the plane and enclosed with a coating 1000 of a dye that suppresses reflection of near-infrared light or absorbs near-infrared light. Bar-shaped markings 1002 made of a material that efficiently reflects near-infrared light are formed on the coating 1000. When the light source glows, the contrast between the coating 1000 and the markings 1002 becomes distinct. When the plane containing the light source is imaged using the camera, the difference in luminance between the coating 1000 and the markings 1002 is intensified.

When a finger 200 is placed in front of the light source as shown in FIG. 10B, an area behind which the markings are hidden by the finger varies depending on the thickness of the finger. The difference in luminance between a portion of an image of a finger depicting a blood vessel and another portion thereof depicting no blood vessel is not intensified to a large degree. When a finger hides part of the markings 1002, the difference in luminance of the part of the markings from the coating is nullified. Coordinates indicating each point at which the intense difference in luminance terminates delineate the finger. This is achieved through very simple difference processing.

In order to measure the thickness of a finger, at least two markings are preferably needed. Since a finger has joints, the thickness thereof is uneven. Therefore, when four markings are used as illustrated, the thickness of a finger can be determined more accurately. Moreover, when the four markings are used, even if a finger is inserted while being slightly inclined, the inclination can be detected.

Figure 4:
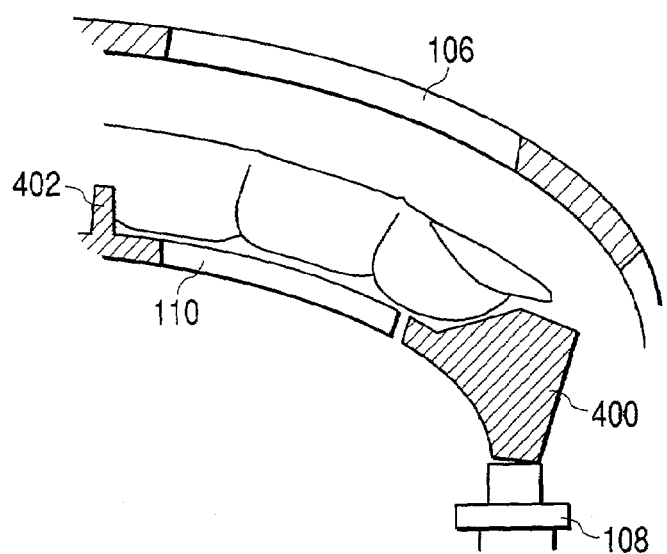
FIG. 4 shows an exemplary cross-section of a structure which is included in an apparatus and into which a finger is inserted.

FIG. 4 is an enlarged view of a structure into which a finger is inserted that is included in an identification apparatus according to an embodiment of the invention. A near-infrared light source 106 is located in the upper part of the structure, and an optical opening 110 is formed in the lower part thereof. A camera 114 is located below the opening. A touch portion 400 of a button switch is pressed with a finger. When the touch portion 400 is pressed while being touched directly with a finger, a contact switch 108 is turned on. The contact switch 108 is preferably realized with a pushbutton with a spring. When the contact switch 108 is pressed, the contact switch conducts. When the contact switch 108 is released, the spring automatically returns the switch to the initial position, isolating the contacts. When the opening 110 and button 400 are arched as illustrated so that a finger will be bent naturally, a finger is bent without fail. Consequently, the probability that part of a hemal pattern is missing because the digital blood vessels are compressed is greatly reduced. Moreover, when a glass plate covering the opening 110 is located at a lower position or a finger rest 402 is formed, the root of the finger floats relative to the opening 110. Consequently, compression of the blood vessels occurring when a finger comes into contact with the opening 110 can be more effectively prevented.

Figure 13:
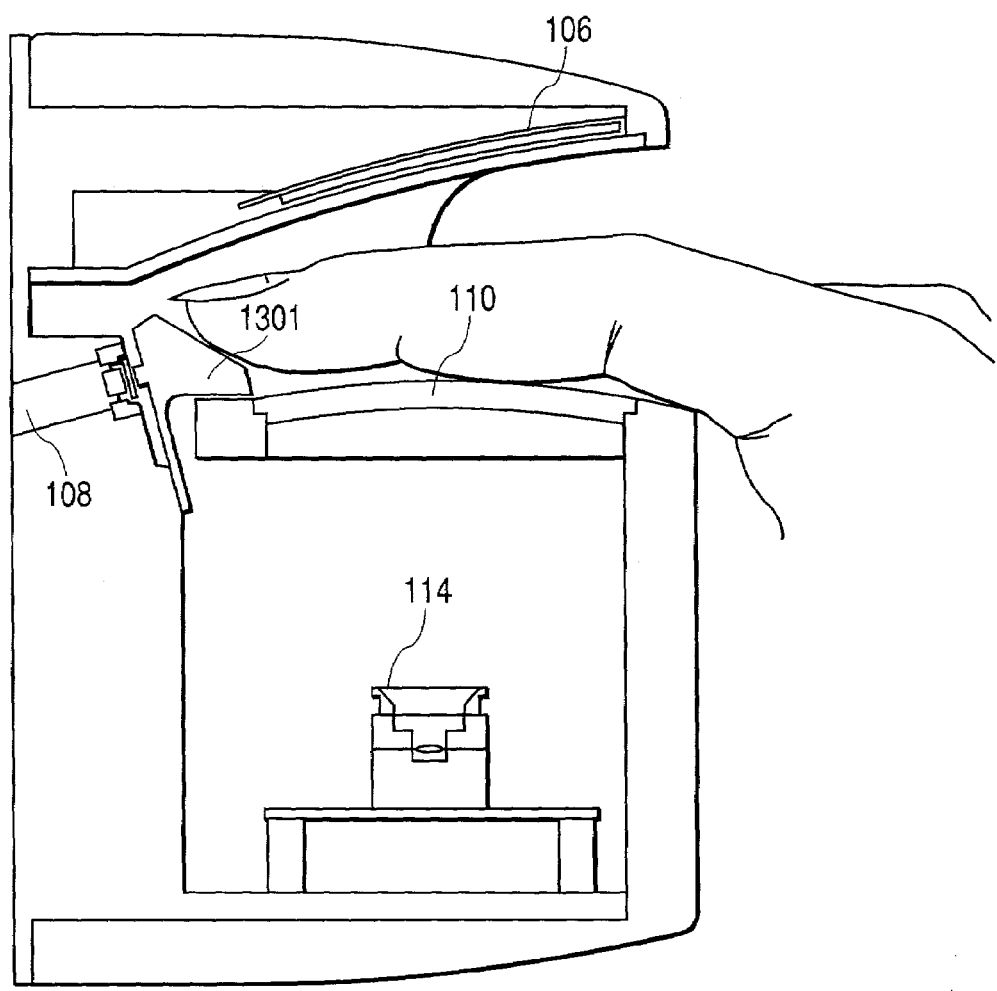
FIG. 13 shows a cross-section of a structure which is included in an apparatus in accordance with a second embodiment and into which a finger is inserted.

FIG. 13 is an enlarged view showing a lateral side of another embodiment of the present invention having a structure in which a finger is inserted. Compared with the structure shown in FIG. 4, the position of a button switch 1301 is different from the position of the button switch 400. Unlike the button switch 400 shown in FIG. 4, the contact switch 108 of the button switch 1301 is pressed with a forward thrust of a finger. Compared with the press of the button switch 400 shown in FIG. 4, the press of the button switch 1301 results from an unnatural movement of a finger. When the button switch 1301 is realized with a switch means that is not clicked on or off, such as, a touch sensor, a user can maneuver the button switch with a good sense of touch.

Figure 5:
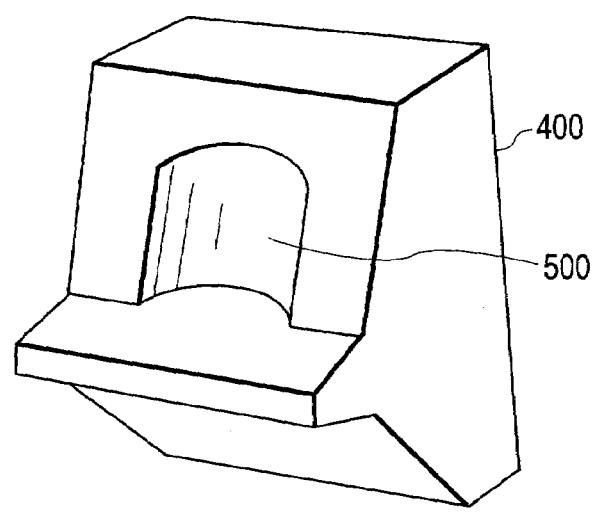
FIG. 5 shows an exemplary button switch.

FIG. 5 is an enlarged view of an exemplary button 400. The button 400 has a concave part 500 formed in a side thereof to contact a finger so that the fingertip will fit within the concave part. Consequently, every time a finger is inserted, the fingertip is relocated at the same position with higher accuracy. A positional deviation caused by a press of the button 400 will not occur. As also shown in FIG. 4, the height of the button 400 is preferably limited to a value permitting only the ventral part of a fingertip to lie on the button. A space is created above the button 400 so that the button can be pressed with a finger having a long nail or having a false nail attached thereto.

Figure 6:
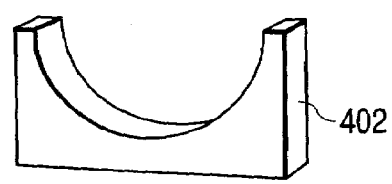
FIG. 6 shows an exemplary finger rest.

FIG. 6 is an enlarged view showing an exemplary finger rest 402 formed to bear the root of a finger. The finger rest 402 may be a simple plate-like projection. The simple plate-like projection is preferably machined to have one side thereof dented like a semicircular recess so that the depth of the semicircular recess will be a bit larger than the thickness of a finger. Consequently, a sideways displacement of a finger can be naturally prevented. In this case, the finger rest 402 is not exactly an independent means but is a variant of the aforesaid guide groove 112. The finger rest 402 thus fills the role of a guide that directs a user to place his/her finger in an appropriate position.

Figure 7:
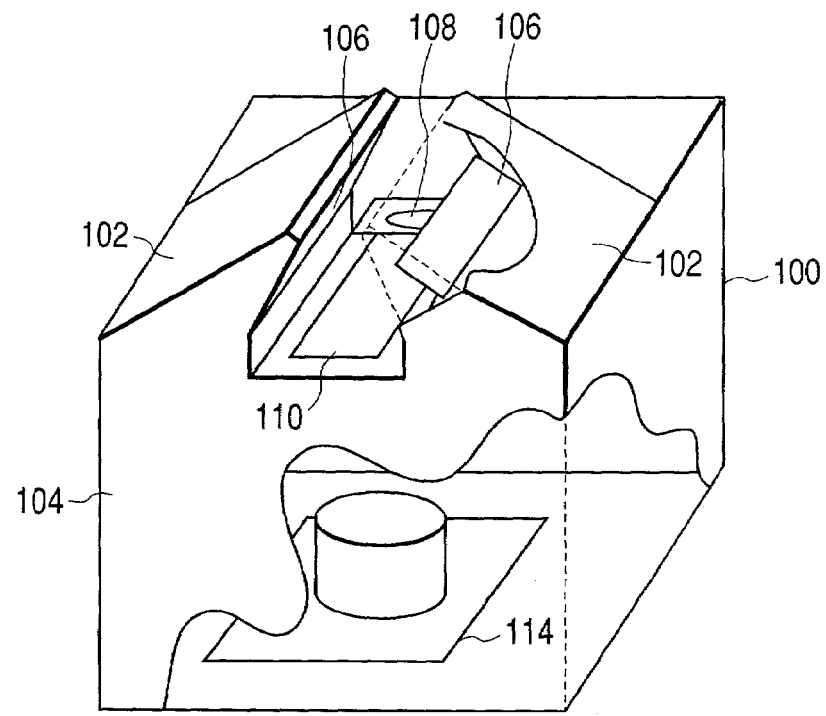
FIG. 7 shows another example of an apparatus according to the present invention.

FIG. 7 shows an example of another variant of the identification apparatus 100. In the example shown in FIG. 1, the light source unit 102 is shaped like a roof in order to intercept illumination light coming from the ceiling or other external source. In the FIG. 1 case, however, since a user is asked to insert his/her finger in a shielded space, the user may feel uneasy. For this reason, as shown in FIG. 7, the light source may be located obliquely above a finger, and a cover obstructing the user's view of his/her finger is thus excluded. In the illustrated example, a roof-like light source unit is extended obliquely from both sides of an opening. A light source 106 is incorporated in each of the light source units. The two light sources are distributed evenly around the opening. This is because when one light source is included, light transmitted by a finger is polarized to create a light spot. Consequently, a correct hemal pattern may not be visualized.

Figure 8:
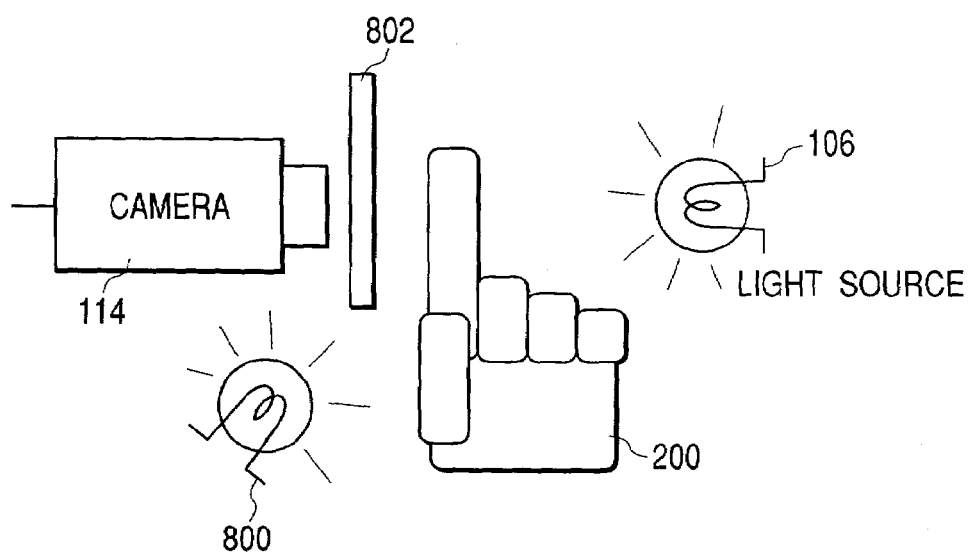
FIG. 8 shows an example of the elements included in an optical system used to implement the present invention.

FIG. 8 shows an example of another arrangement of optical elements included in the identification apparatus 100. A light source 800 provides reflective light while a light source 106 provides transmissive light. These two light sources 106, 800 are turned on or off under the control of a computer 204. At this time, the on or off states of the light sources may be combined arbitrarily. For example, the reflective light source 800 generates visible light, and a camera 114 images the surface of a finger. In the aforesaid embodiment, an optical filter transmits near-infrared light alone. Instead, an optical filter 802 of a variable or switchable type is included herein. Namely, the operating modes of the optical filter 802 may be switched so that visible light will also be passed if necessary. This makes it possible to visualize the features of a living body including the fingerprint on the surface of a finger. The feature of a living body detectable on the surface of a finger and a hemal pattern may be used in combination for identification. This leads to improved precision in identification.

The advantages provided by the employment of the button switch in the identification apparatus have been previously described. The action of pressing a button signifies that a user touches the apparatus. It cannot be said that there is no possibility that a user may loathe touching the apparatus from a sanitary viewpoint. This kind of a user's feeling can be alleviated by the adoption of a generally used antibacterial material for the apparatus body or the button. Letters "antibacterial" to be inscribed in the apparatus body will produce a good psychological effect on a user. According to the configuration in which the present invention is implemented, the sensor used to acquire a hemal pattern need not be exposed on the surface of the apparatus body. The surface of the apparatus can therefore be readily processed to be antibacterial. Living-body identification methods according to which a sensor must be brought into direct contact with a living body have difficulty in making the sensor antibacterial. The present invention has overcome the difficulty.

In the aforesaid embodiment, the button switch is realized with a mechanical pushbutton. Alternatively, for example, electrostatic switches that conduct when touched with a finger may be substituted for the switches 400 and 108. Additionally, a combination of a light source and an optical sensor may be used so that when a fingertip comes to a predetermined position to thus intercept light, a switch will be turned on. In this case, various types of sensors including a sensor sensitive to presence of a human being can be utilized.

Figure 14:
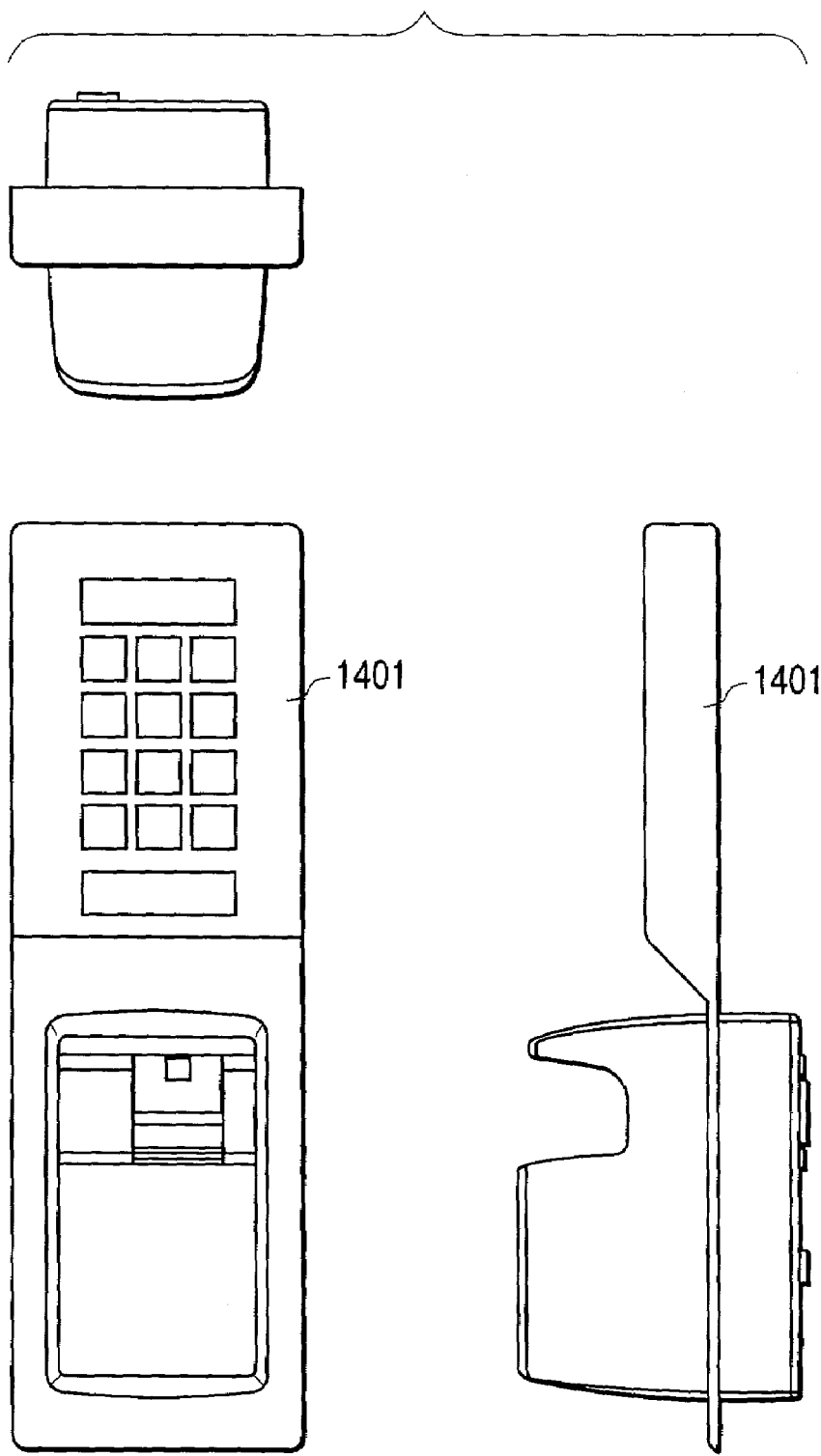
FIG. 14 shows an example of a finger identification apparatus including a keypad.

FIG. 14 shows a finger identification apparatus having a keypad. Even if identification using a finger fails, identification can be retried by entering a password, which is registered in advance, using keypad 140. Moreover, when identification using a finger and identification using a password may be combined, more reliable identification can be achieved. Furthermore, an action to be performed after identification may be differentiated between identification using a finger and identification using a password.

According to the present invention, a finger is smoothly led to a specific position, a hemal pattern of the finger is visualized, a visualized pattern in a produced image can be collated with registered patterns on a stable basis without the necessity of alignment or correction that is required due to turning of a finger. Moreover, the probability that part of a hemal pattern is missing because a finger is compressed will be reduced. This leads to improved precision in identification.

Nothing in the above description is meant to limit the present invention to any specific materials, geometry, or orientation of parts. Many part/orientation substitutions are contemplated within the scope of the present invention. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A finger blood vessel identification apparatus comprising:
   a guide member for positioning a finger;
   a switch member to be pressed on with a fingertip of the finger;
   an optical opening member of a transparent material;
   a light source for radiating a light to the finger;
   an imaging unit for imaging a transmitted light from the finger through the optical opening; and
   an identifying unit that, when said switch member is pressed on, performs identification by comparing an extracted blood vessel pattern from an image imaged by said imaging unit with a registered blood vessel pattern,
   wherein the optical opening is closer to the imaging unit than the contact surface between the finger and the guide member is to the imaging unit, to prevent the finger positioned on the guide member from touching the optical opening.

2. The finger blood vessel identification apparatus according to claim 1, wherein a surface of said switch member to be touched with the finger is dented.

3. The finger blood vessel identification apparatus according to claim 1,
   wherein said optical opening has a shape and an area that permit the finger to intercept extraneous light from reaching the optical opening.

4. The finger blood vessel identification apparatus according to claim 1, wherein a dye made of an antireflective material is applied to the surface of said guide member except the portion of the optical opening.

5. The blood vessel identification apparatus according to claim 1, wherein the guide member is in a shape such that the blood vessel is not compressed.

6. The finger blood vessel identification apparatus according to claim 1, wherein said light source is housed in an upper structure of the apparatus and further wherein said upper structure is arched in a long direction of the finger.

7. The finger blood vessel identification apparatus according to claim 6, wherein said optical opening member is housed in a lower structure of the apparatus and further wherein said lower structure is arched in a long direction of the finger, and further wherein a curvature of the arched upper structure is greater than a curvature of the lower structure.

8. The finger blood vessel identification apparatus according to claim 1, wherein said optical opening member is housed in a lower structure of the apparatus and further wherein said lower structure is arched in a long direction of the finger.

9. The finger blood vessel identification apparatus according to claim 1, wherein said light source is housed in an upper structure of the apparatus and said optical opening member is housed in a lower structure of the apparatus, the upper and lower structures defining a finger positioning unit into which the finger is to be inserted;

further wherein a distance between the upper structure and the lower structure is larger at the end of the finger positioning unit at which a root of the finger is positioned than at the end of the finger positioning unit at which a fingertip is positioned.

10. A finger blood vessel identification apparatus comprising:

guide member for positioning a finger in a bent posture;
an optical opening member made of a transparent material;
a light source for radiating a light to the finger;
an imaging unit for imaging a transmitted light from the finger through the optical opening; and
an identifying unit for performing identification by comparing an extracted blood vessel pattern from an image imaged by said imaging unit with a registered blood vessel pattern,
wherein the optical opening is closer to the imaging unit than the contact surface between the finger and the guide member is to the imaging unit, to prevent the finger positioned on the guide member from touching the optical opening.

11. The finger blood vessel identification apparatus according to claim 10, wherein said light source is arched and said optical opening is arched, and further wherein the curvature of the arch of said light source is greater than the curvature of the arch of the optical opening.

12. The finger blood vessel identification apparatus according to claim 10, wherein the distance between said light source and said optical opening is larger at the end of a finger positioning space at which a root is positioned than at the end of the finger positioning space at which the fingertip is positioned.

13. The finger blood vessel identification apparatus according to claim 10, wherein said optical opening has a shape and an area that permit the finger to intercept extraneous light from reaching the optical opening.

14. The finger blood vessel identification apparatus according to claim 10, further comprising:

a touch sensor, wherein the identifying unit begins performing the identification when the touch is on.

15. The finger blood vessel identification apparatus according to claim 10, further comprising:

a switch member to be pressed by a tip of the finger, wherein the identification unit commences identification when said switch member is pressed.

16. The finger blood vessel identification apparatus according to claim 15, wherein a surface of said switch member to be touched with the finger is dented.

17. The finger blood vessel identification apparatus according to claim 10, wherein said light source is housed in an upper structure of the apparatus and further wherein said upper structure is arched in a long direction of the finger.

18. The finger blood vessel identification apparatus according to claim 17, wherein said optical opening member is housed in a lower structure of the apparatus and further wherein said lower structure is arched in a long direction of the finger, and further wherein a curvature of the arched upper structure is greater than a curvature of the lower structure.

19. The finger blood vessel identification apparatus according to claim 10, wherein said optical opening member is housed in a lower structure of the apparatus and further wherein said lower structure is arched in a long direction of the finger.

20. The finger blood vessel identification apparatus according to claim 10, wherein said light source is housed in an upper structure of the apparatus and said optical opening member is housed in a lower structure of the apparatus, the upper and lower structures defining a finger positioning unit into which the finger is to be inserted;

further wherein a distance between the upper structure and the lower structure is larger at the end of the finger positioning unit at which a root of the finger is positioned than at the end of the finger positioning unit at which a fingertip is positioned.

21. The finger blood vessel identification apparatus according to claim 10, wherein a dye made of an antireflective material is applied to surfaces of said guide member.

22. A finger blood vessel identification apparatus comprising:

a guide member for positioning a finger;
a light source for radiating transmissive light through the finger;
a reflective light source for radiating reflective light that reflects off of the finger;
an imaging unit for imaging a transmitted and reflected light from the finger through an optical opening; and
an identifying unit for performing identification by comparing an extracted blood vessel pattern from an image imaged by said imaging unit with a registered blood vessel pattern,
wherein the optical opening is closer to the imaging unit than the contact surface between the finger and the guide member is to the imaging unit, to prevent the finger positioned on the guide member from touching the optical opening.

23. The finger blood vessel identification apparatus according to claim 22, further comprising:

an optical filter in said imaging unit, wherein when said transmissive light source and reflective light source are switched, a wavelength band of light capable of being transmitted through the optical filter is changed based on the switch in light source wavelength.

* * * * *